(12) United States Patent
Hawkinson et al.

(10) Patent No.: US 6,658,491 B1
(45) Date of Patent: Dec. 2, 2003

(54) SYSTEM AND METHOD FOR CONSTRUCTING AN OLE PROCESS CONTROL COMPLIANT DATA SERVER FROM A NONCOMPLIANT USER APPLICATION

(75) Inventors: Ellen B. Hawkinson, Phoenix, AZ (US); Ziad M. Kaakani, Scottsdale, AZ (US); Christian R. Thomas, Scottsdale, AZ (US); James A. Weeldreyer, Scottsdale, AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/205,210

(22) Filed: Dec. 4, 1998

(51) Int. Cl.$^7$ .................................................. G06F 9/00
(52) U.S. Cl. ........................................ 709/331; 709/332
(58) Field of Search .................................. 709/315, 311, 709/331, 316, 332, 219, 321, 312; 707/103, 100

(56) References Cited

U.S. PATENT DOCUMENTS

| | | | | |
|---|---|---|---|---|
| 5,864,338 A | * | 1/1999 | Nestor et al. | 345/339 |
| 6,195,794 B1 | * | 2/2001 | Buxton | 717/108 |
| 6,282,542 B1 | * | 8/2001 | Carneal et al. | 709/219 |
| 6,304,918 B1 | * | 10/2001 | Fraley et al. | 709/322 |

OTHER PUBLICATIONS

Bryan Walters, Mastering OLE 2 1995, Sybex, p. 20.*
Blackwell, R., Microsoft solutions for manufacturing industry 1996, IEEE, Digest No: 1996/278, pp. 7/1–7/27.*
Bryan Walters, Mastering OLE 2 1995, Sybex, p. 20.*
Blackwell, R., Microsoft solutions for manufacturing industry 1996, IEEE, Digest No: 1996/278, pp. 7/1–7/27.*
Don Box; Essential COM; Addison–Wesley; Massachusetts; Jun. 1999; Table of Contents and pp 188–197.
Dale Rogerson; Inside COM—Microsoft's Component Object Model; Microsoft Press, Washington; 1997; Table of Contents and pp 159–208.

Gagnon, Francois, et al: "On The Development Of A Generic Interface For HLA And DIS Simulations," Proceedings: 2nd International Workshop on Distributed Interactive Simulation and Real–Time Applications (Cat. No. 98EX191), Montreal, Quebec, Canada, Jul. 19–20, 1998, pp. 52–59, XP002138396 Los Alamitos, CA, USA IEEE Comput. Soc. USA ISBN: 0–8186–8594–8 IEL Online Library.

OPC Task Force: "OPC Overview Version 1.0," OPC OLE For Process Control, Oct. 27, 1998, pp. i–v, 1–11, XP002138397, OPC Foundation, Retrieved from the Internet: <http://www.opcfoundation.org/specs/OPCOVW.zip>.

OPC Task Force: "OPC Common Definitions And Interfaces Version 1.0," OPC OLE for Process Control, Oct. 27, 1998, pp. i–vi, 1–27, XP002138398, OPC Foundation, Retrieved from the Internet: <http://www.opcfoundation.org/specs/OPCCOMN.zip>.

Janke, M.: "OPC–Simple Software Integration For Legacy Systems," 1999 Advanced Process Control Applications For Industry Workshop. Record of Workshop Papers, IEEE Industry Applications Society, Apr. 29–30, 1999, pp. 9–14, XP002138399, New York, NY, USA, IEEE, USA, IEL Online Library.

* cited by examiner

Primary Examiner—John Follansbee
Assistant Examiner—The Thanh Ho
(74) Attorney, Agent, or Firm—Mark E. Kelley; Hilt Gaines, P.C.

(57) ABSTRACT

A system for, and method of, constructing an Object Linking and Embedding (OLE) for Process Control (OPC) compliant data server from a device-specific noncompliant user application and a real-time process control system employing the system or the method. In one embodiment, the system includes: (1) a generic OPC compliant interface object and (2) a template associated with the generic OPC compliant interface object. The template is modifiable and combinable with a device-specific interface portion to yield the device-specific noncompliant user application. The device-specific noncompliant user application is dynamically linkable with and aggregates to the generic OPC compliant interface object to yield the OPC compliant data server.

24 Claims, 4 Drawing Sheets

SYSTEM AND METHOD FOR CONSTRUCTING AN OLE PROCESS CONTROL COMPLIANT DATA SERVER FROM A NONCOMPLIANT USER APPLICATION

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyrights whatsoever.

REFERENCE TO COMPUTER PROGRAM LISTING APPENDIX

A computer program listing appendix containing computer program listings of a template and associated documentation in a file named "ProgramListing.txt" having a file size of 59 KB and created on Jun. 13, 2003 from a Previously submitted microfiche is submitted with this application and is incorporated herein by reference.

TECHNICAL FIELD OF THE INVENTION

The present invention is directed, in general, to real-time process control systems and, more specifically, to a system and method for constructing an Object Linking and Embedding (OLE) for Process Control (OPC) compliant data server from a noncompliant user application and a real-time process control system employing the system or method.

BACKGROUND OF THE INVENTION

Real-time process control systems were first implemented within a single computer system. As the need to monitor and control more physical devices increased, the complexity and size of the process control systems also increased. Shortly thereafter, single computer real-time process control systems were unable to process all the information within a timely manner as required by the real-time process control environments.

To correct this processing problem, real-time process control systems evolved into multiple computer systems that were connected to each other with proprietary communication interfaces. The multiple computer systems processed data locally and then communicated the information to the other computer systems over the proprietary communication interfaces. Since, the computer systems did not use a standard communication interface nor a standard protocol between each of the computer systems, modifications and additions to the systems were difficult, if not impossible.

This inter-computer incompatibility problem was resolved when the computer industry developed standardized networks and network protocols. Two of the industry standards were Ethernet and Transmission Control Protocol/Internet Protocol ("TCP/IP") used on 10 base 2 coaxial cable. Ethernet and TCP/IP allowed various computer systems the ability to communicate to each other without using proprietary communication interfaces.

The next evolution in real-time process control systems was object oriented distributed processing. In object oriented distributed processing, requesting programs ("clients") would call resource programs ("objects") to process a request. In this design, the clients and objects may be located on different computers on the network or are on the same computer. To facilitate a standardized way for clients to locate and communicate with objects, Microsoft Corporation developed the Component Object Model ("COM") protocol. The COM protocol, incorporated into software libraries called "COM libraries," defines a standardized interface for locating and communicating to objects over the network without requiring the clients to know the location of the desired objects.

The process control industry incorporated the COM standard and Object Linking and Embedding ("OLE") in its real-time process control standard, calling the resulting standard OLE for Process Control ("OPC"). The OPC standard defined the interfaces for distributed real-time process control object processing.

For companies to sell real-time process control systems, the real-time process control systems had to be COM and OPC compliant. This required the developers of the systems to have learned the intricacies of the COM and the OPC standards. Next, the programmers had to write detailed software programs that implemented the COM standards. Then, the programmers had to write detailed software programs that implemented the OPC standards which incorporated the COM standards. Finally, the programmers had to repeat this process for each type of distributed object processing that was performed within the real-time process control system.

When the programmers found an incorrect implementation of the COM and the OPC standards, the programmers had to correct each software program that was affected. This whole process incurred a great amount of time and expense. What is needed in the art is a way to rapidly develop COM/OPC compliant software for real-time process control systems.

SUMMARY OF THE INVENTION

To address the above-discussed deficiencies of the prior art, the present invention provides a system for, and method of, constructing an OPC compliant data server from a device-specific noncompliant user application and a real-time process control system employing the system or the method. In one embodiment, the system includes: (1) a generic OPC compliant interface object and (2) a template associated with the generic OPC compliant interface object. The template is modifiable and combinable with a device-specific interface portion to yield the device-specific noncompliant user application. The device-specific noncompliant user application is dynamically linkable with and aggregates with the generic OPC compliant interface object to yield the OPC compliant data server.

The present invention therefore introduces the broad concept of dividing an OPC compliant data server into two distinct portions: a first portion that is generic and OPC compliant and a second portion that is specific to an underlying device or process control system and does not need to be entirely OPC compliant. A user wishing to create an OPC compliant data server is merely required to customize a template to yield the second portion. During run-time, the first and second portions are dynamically linked. The second portion aggregates the first, allowing the noncompliant second portion to inherit at least some of the attributes of the compliant first portion.

In one embodiment of the present invention, the system further includes a class factory that creates multiple related instances of objects. In a related embodiment, the class factory creates objects and manages global resources with respect to the objects. Those skilled in the pertinent art are familiar with class factories and their use in other object-oriented environments. The present invention can employ class factories to instantiate the objects needed to enable a particular server.

In one embodiment of the present invention, the system further includes a cache memory associated with the generic OPC compliant interface object. The generic OPC compliant interface object retrieves items from the cache memory in response to requests from multiple OPC clients. In a related embodiment, the generic OPC compliant interface object retrieves information from a device through the device-specific noncompliant user application and stores the information in the cache memory.

In one embodiment of the present invention, the class factory is capable of self-registration. However, the present invention need not be capable of self-registration.

In one embodiment of the present invention, the generic OPC compliant interface object is Component Object Module (COM) compliant. Those skilled in the pertinent art will perceive, however, that the present invention may be employed to advantage in object-oriented environments that are not COM-compliant.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
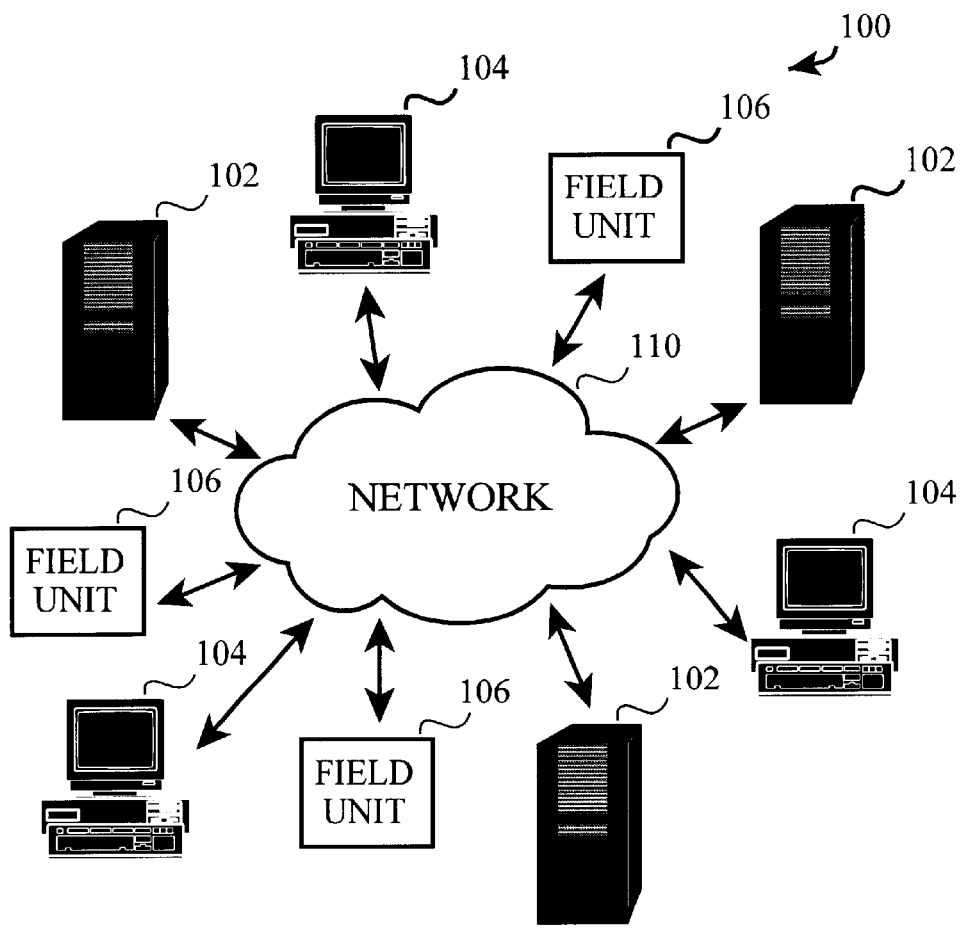
FIG. 1 illustrates a block diagram of a real-time process control system that forms one environment within which the present invention can operate.

Referring initially to FIG. 1, illustrated is a block diagram of a real-time process control system, generally designated 100, that forms one environment within which the present invention can operate. The real-time process control system 100 comprises a network 110 that interconnects a server 102, an operator interface 104 and a field unit 106. In the illustrated embodiment of the present invention, the real-time process control system 100 may comprise any number of servers 102, operator interfaces 104 and field units 106.

The network 110 comprises an industry standard network and industry standard network protocols. In the illustrated embodiment, the industry standard network is "10 base T," employing twisted pair cables. Other embodiments of the present invention use other networks comprising "10 base 2" employing coaxial cables, fiber optic cables or a combination of the two. Wireless communications may also be used for all or part of the network communications. The industry standard network protocols, in one embodiment of the present invention, are ETHERNET® and Transmission Control Protocol/Internet Protocol ("TCP/IP").

The server 102 comprises software programs that monitor, process information, and control the physical devices within the real-time process control system 100. The software programs comprise a requesting program "client," and a resource program "object" and other miscellaneous programs. The client program sends requests to object programs to perform specific functions. The object programs receive requests and perform the appropriate functions based upon the type of requests sent. The client programs and object programs communicate over the network 110 or internally within the server 102.

The operator interface 104 comprises a computer and a display. The operator interface 104 displays information concerning the current state of the system 100. The operator interface 104 also accepts operator input to perform functions such as controlling a physical device or requesting other information to be displayed on the operator interface's 104 display. The operator interface 104 may comprise both client programs and object programs. The operator interface 104 communicates to other programs over the network 110.

The field unit 106 comprises object programs that perform tasks related to the physical devices that make up the real-time process control system 100. In one embodiment of the present invention, the field unit's object programs collect status information, process data and control the physical devices. In other embodiments, the field unit 106 may perform more or less functions than described above. The field unit 106 responds to client's requests over the network 110.

Figure 2:
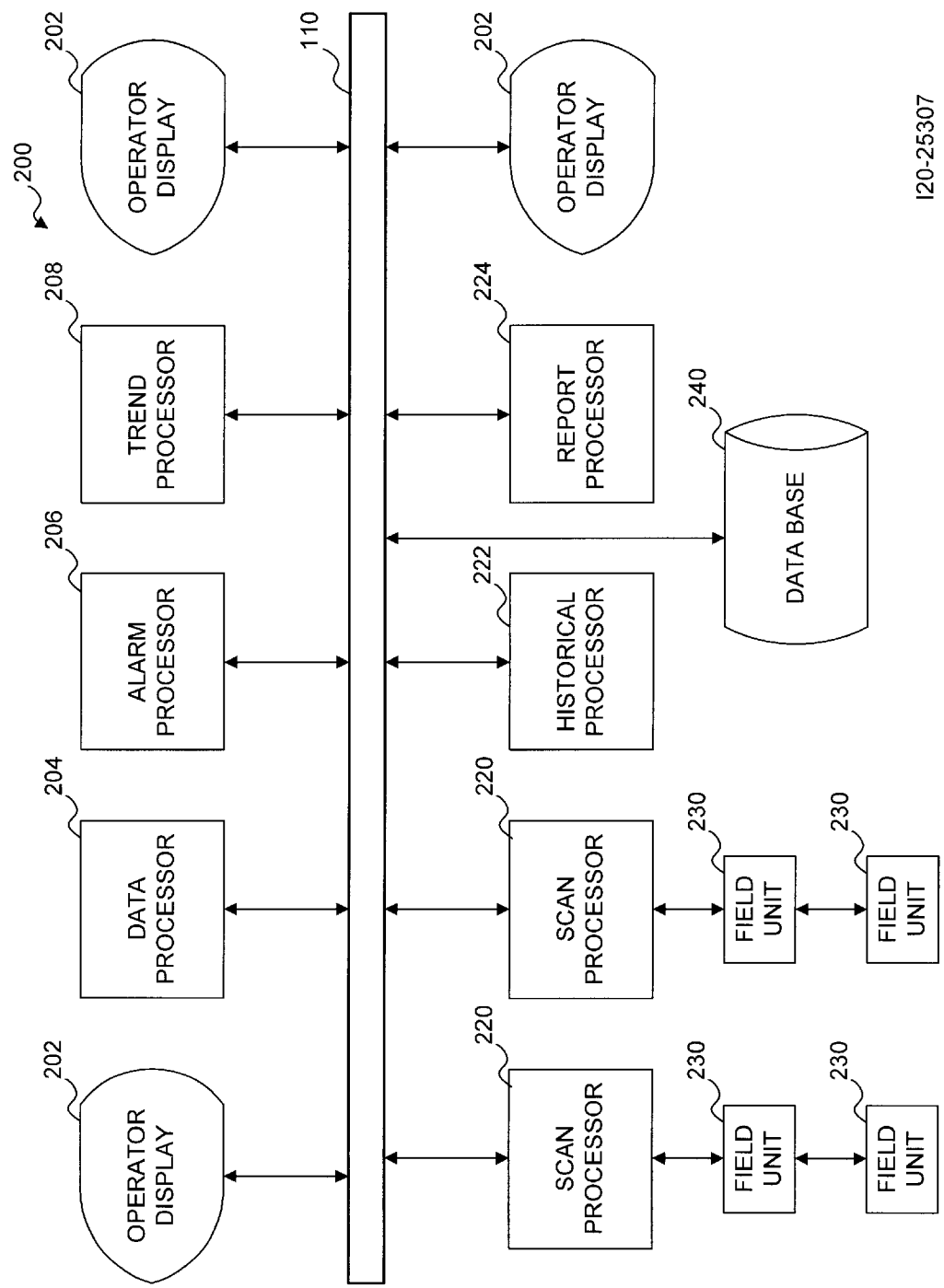
FIG. 2 illustrates a block diagram of a real-time process control software architecture.

Turning now to FIG. 2, illustrated is a block diagram of a real-time process control software architecture, generally designated 200. The real-time process control software architecture 200 comprises an operator display software 202, a data processor software 204, an alarm processor software 206, a trend processor software 208, a scan processor software 220, a historical processor software 222, a report processor software 224, a field unit software 230, a database software 240 and the network 110 of FIG. 1. In the illustrated embodiment of the present invention, the real-time process control software architecture 200 may comprise a plurality of the above software types.

The operator display software 202 displays the real-time process control system 100 information on a display or a plurality of displays. The operator display software 202 also processes the operator requests and communicates to other real-time process control software over the network 110.

The data processor software 204 processes the data collected and the data generated from the real-time process control system 100. The data processor software 204 stores and retrieves data to the database software 240 and communicates to other real-time process control software over the network 110.

The alarm processor software 206 performs alarm processing on the data collected. The alarm processor software 206 notifies the operator display software 202 and the report processor software 224 of any alarm conditions or non-alarm conditions that exist in the real-time process control system 100. The alarm processor software 206 also stores and retrieves information from the database software 240 over the network 110.

The trend processor software 208 performs trending functions for the real-time process control system 100. The trend processor software will collect operator selected data, generate the desired trend information and distribute the trend data to the operator display software 202 and the database software 240 over the network 110.

The scan processor software 220 collects data from a plurality of field units 230 and converts the data into the appropriate form usable by the real-time process control system 100. The scan processor software 220 distributes, over the network 110, the collected data to the other software processors so the software processors can perform their associated functions. The scan processor software 220 also stores and retrieves information from the database software 240.

The field unit 230 collects the specific data from the physical devices attached to the field unit 230. The physical devices are not shown since there are a multitude of physical devices that can be monitored by a real-time process control system. The field unit 230 sends the physical device data to the scan processor software 220. The field unit 230 also processes control requests.

The historical processor software 222 collects and processes historical information about the real-time process control system 100. The historical processor software 222 also performs archival functions and stores information to the database software 240.

The report processor software 224 generates the reports for the real-time process control system 100. The report processor software 224 sends the generated reports to the operator display software 202, the historical processor software 222, the database software 240 and to printing devices if attached to the system 100.

The database software 240 processes all request for retrieval and storage of information for the real-time process control system 100. In other embodiments of the present invention, the system 100 comprises a plurality of database software units contained on a plurality of computers.

Those skilled in the art should know that other embodiments of the present invention may include a plurality of processing software described above. Also, other embodiments of the present invention may include more or less processing software types and contain more or less functional capabilities than described above.

Figure 3:
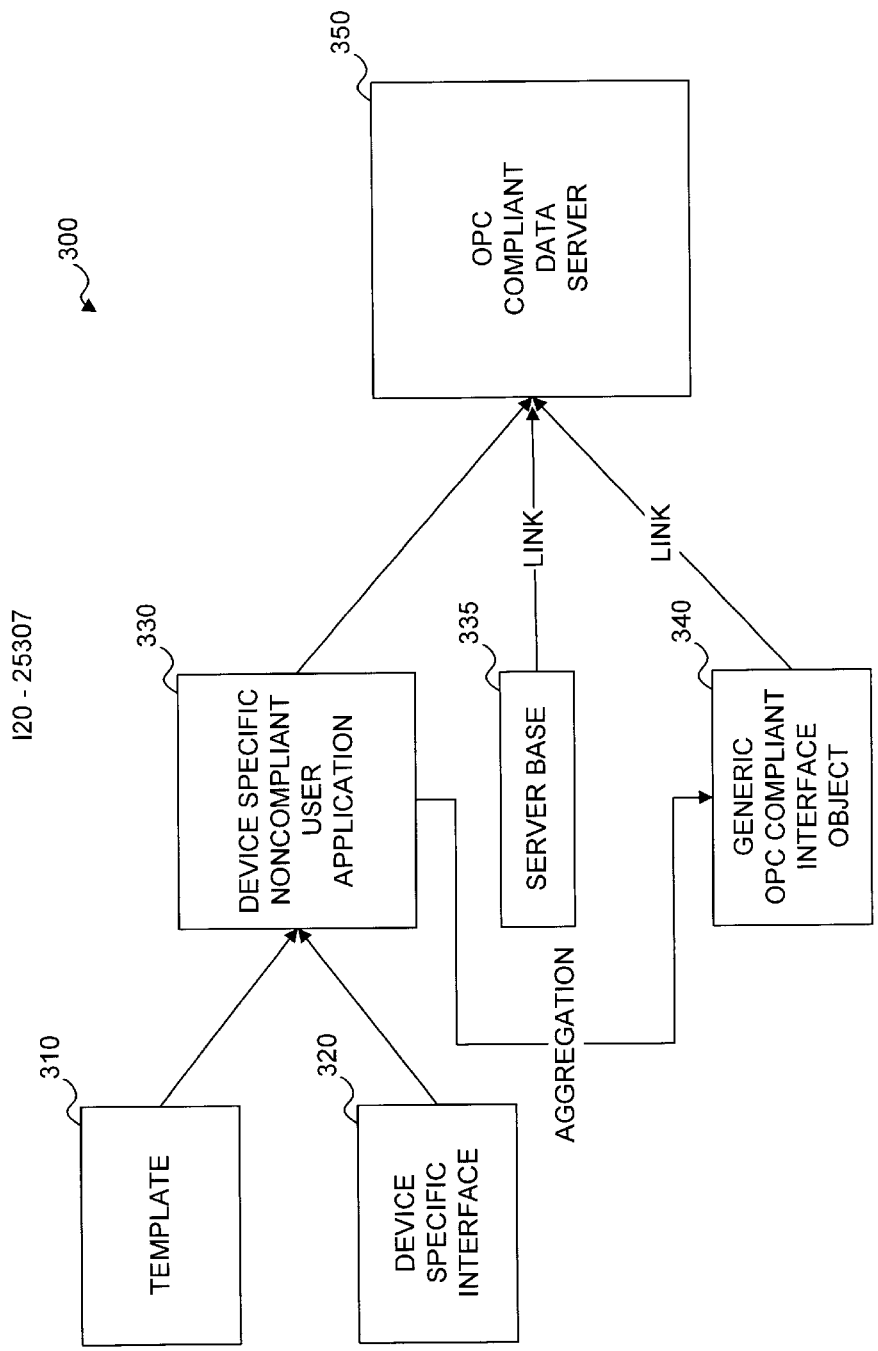
FIG. 3 illustrates a block diagram of the overall process of creating an OPC compliant data server according to the principles of the present invention.

Turning now to FIG. 3, illustrated is a block diagram of the overall process of creating an OPC compliant data server according to the principles of the present invention, generally designated 300. The user of the present invention starts with a template 310 and a device specific interface 320. The template 310 is a collection of source code for data server software routines such as the ones disclosed in the computer program listing appendix submitted with this application and are incorporated herein by reference. The user then modifies the template 310 to meet the user's specific real-time process control requirements.

The device specific interface 320 is the user's software program that interfaces with the user's specific device or devices. The user combines the template 310 and the device specific interface 320 to produce a device specific noncompliant user application 330.

The device specific noncompliant user application 330 performs the user's required functions, but is not OPC compliant. In the illustrated embodiment of the present invention, the invention also comprises a server base dynamically linked library ("server base DLL") 335. The server base DLL 335 comprises software routines, when implemented with the device specific noncompliant user application, allows the device specific noncompliant user application 330 to perform data server functions. The advantage of using the server base DLL 335, is that the user saves time by not programming the data server functions.

The present invention also comprises a set of software programs that implement the OPC/COM interface standards in the form of a generic OPC compliant interface object 340. Since the generic OPC compliant interface object 340 is also COM compliant, the generic OPC compliant interface object 340 is capable of self-registration.

In the illustrated embodiment of the present invention, there is aggregation between the device specific noncompliant user application 340 and the generic OPC compliant interface object 340. Aggregation is a method, under the COM standard, to implement object inheritance associated with object oriented distributed processing. In aggregation, an outer object passes the inner component's interface pointer directly to the client program instead of reimplementing all the functions of the interface and then forwarding the call to the inner component. In the present invention, the interface of the device specific noncompliant user application 330 aggregates to the generic OPC compliant interface object 340.

Background information concerning COM aggregation is discussed in Inside COM by Dale Rogerson, Microsoft Press 1997 and in Essential COM by Don Box, Addison-Wesley 1998. The foregoing publications are incorporated herein by reference.

Next, the user links the base server DLL 335 and the generic OPC compliant interface object 340 with the device specific noncompliant user application 330 to produce the final OPC compliant data server 350. The OPC compliant data server 350 is the data server for a specific device. The above process is repeated for each device in the real-time process control system 100 requiring an OPC compliant data server.

In the illustrated embodiment of the present invention, the generic OPC compliant interface object 340 is a set of dynamically linkable libraries ("DLLs"). When the user links the DLLs, the DLLs are not incorporated into the OPC compliant data server 350 executable software. The OPC compliant data server 350 executable software contains operating system calls that will load the DLLs when needed.

The advantage of using DLLs for the OPC/COM compliant interface software and the server base software is that when new updates to the OPC/COM compliant interface software or the server base software are distributed, the user does not have to recompile all the software they have written. The user merely loads the new DLLs on the machine where the OPC compliant data server 350 is located and reinitialize the software program. Thus, the present invention saves the user a tremendous amount of time and effort by not requiring the user to recompile the user's software programs each time a correction or enhancement is made to the OPC/COM compliant interface software.

Those skilled in the art should note that the present invention is not restricted to the use of a generic OPC compliant interface object in the form of DLLs. The use of a generic OPC compliant interface object may be implemented on different types of operating systems that may or may not use DLLs. Also, those skilled in the art should realize that the procedure described above is an overview of the use of the present invention and the present invention is not limited to the procedure described above.

Figure 4:
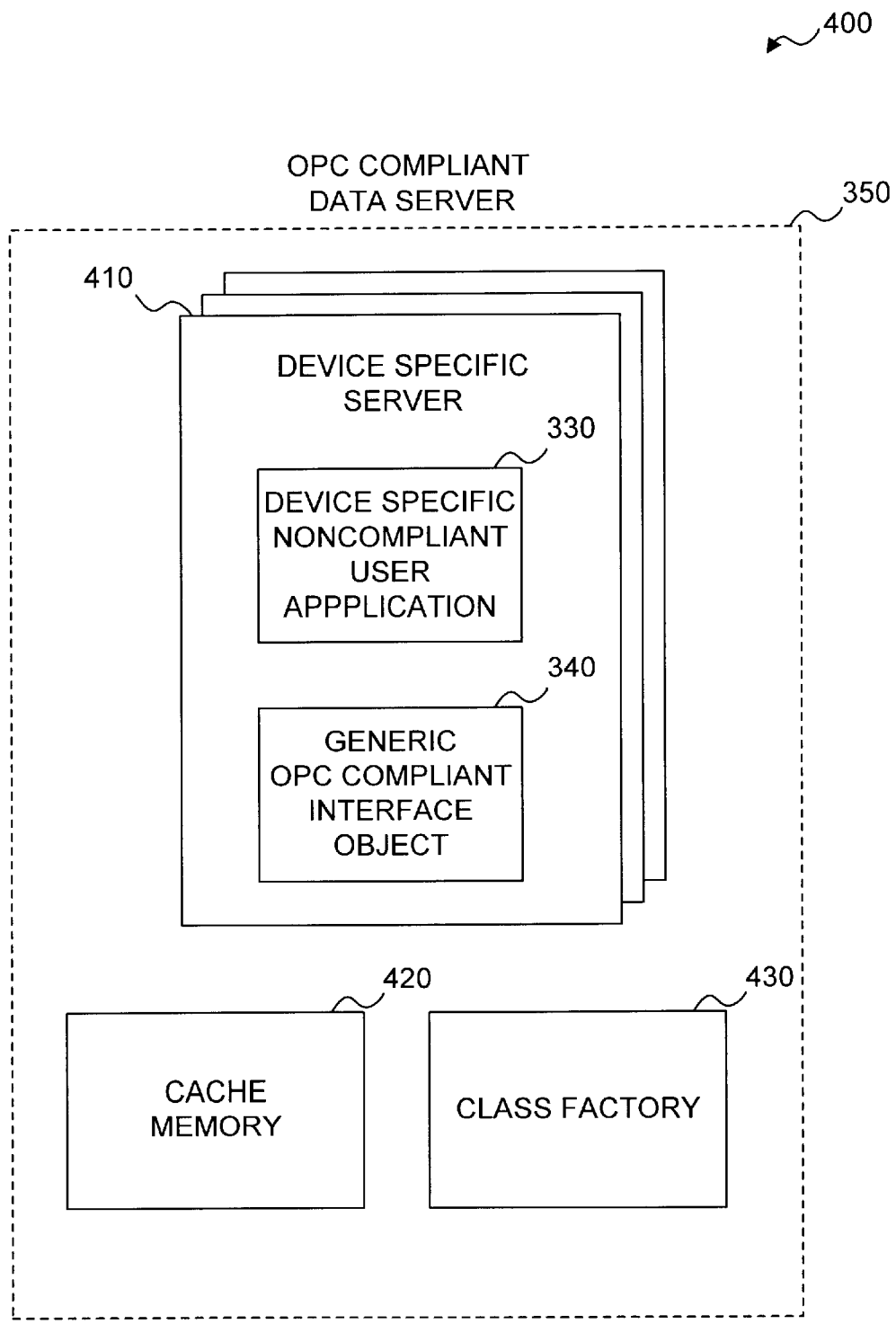
FIG. 4 illustrates a block diagram of an OPC compliant data server of FIG. 3 constructed according to the principles of the present invention.

Turning now to FIG. 4, illustrated is a block diagram of an OPC compliant data server of FIG. 3 constructed according to the principles of the present invention. The OPC compliant data server 350 comprises one or more instances of a device specific server 410, a cache memory 420 and a class factory 430. Each instance of the device specific server 410 comprises the device specific noncompliant user application 330 and the generic OPC compliant interface object 340. See FIG. 3 for a description of the use and advantages of the generic OPC compliant interface object 340. Each instance of the device specific server 410 processes client requests and communicates with the appropriate physical device.

The cache memory 420 comprises a cached storage area used by the OPC compliant data server 350. In one embodiment of the present invention, a client program requests information from the OPC compliant data server 350. The generic OPC compliant interface object 340 then retrieves the appropriate data from the device through the device specific noncompliant user application 330, returns the data to the client and stores the data in the cache memory 420. Upon subsequent requests from clients, the generic OPC compliant interface object retrieves the data from the cache memory 420. The cache memory 420 increases throughput and performance of the OPC compliant data server 350.

In another embodiment of the present invention, for each client information request, the generic OPC compliant interface object 340 retrieves the appropriate data from the cache memory 420 and returns the data to the client. Upon a predetermined interval, the generic OPC compliant interface object 340 retrieves the appropriate data from the device through the device specific noncompliant user application 330 and updates the data in the cache memory 420.

The class factory 430, which is part of the server base DLL 335, creates and manages the device specific server 410 instances and performs class registration under the COM standard. The class factory also manages the other resources associated with each instance of the device specific server 410.

Those skilled in the art should note that the OPC compliant data server may contain more or less features than described above. Also, the OPC compliant data server is not limited to Class registration under the COM standard and may be implemented on different operating systems.

Although the present invention has been described in detail, those skilled in the art should understand that they can make various changes, substitutions and alterations herein without departing from the spirit and scope of the invention in its broadest form.

What is claimed is:

1. A system for constructing an Object Linking and Embedding (OLE) for Process Control (OPC) compliant data server from a device-specific noncompliant user application, comprising:
    a generic OPC compliant interface object; and
    a template associated with said generic OPC compliant interface object, said template being modifiable and combinable with a device-specific interface portion to yield said device-specific noncompliant user application, said device-specific noncompliant user application dynamically linkable with and aggregating to said generic OPC compliant interface object to yield said OPC compliant data server.

2. The system as recited in claim 1 further comprising a class factory that creates and manages multiple related instances of a device specific server within said OPC compliant data server, said device specific server including said device-specific noncompliant user application and said generic OPC compliant interface.

3. The system as recited in claim 1 further comprising a class factory that creates instances of a device specific server within said OPC compliant data server and manages global resources with respect to said device specific server, said device specific server including said device-specific noncompliant user application and said generic OPC compliant interface.

4. The system as recited in claim 1 further comprising a cache memory associated with said generic OPC compliant interface object, said generic OPC compliant interface object retrieving items from said cache memory in response to requests from multiple OPC clients.

5. The system as recited in claim 1 further comprising a cache memory associated with said generic OPC compliant interface object, said generic OPC compliant interface object retrieving items from a device through said device-specific noncompliant user application and storing said items in said cache memory.

6. The system as recited in claim 2 wherein said class factory is capable of self-registration.

7. The system as recited in claim 1 wherein said generic OPC compliant interface object is Component Object Module (COM) compliant.

8. The system as recited in claim 1 further comprising a COM interface implemented by an aggregating COM object and called by an aggregated COM object.

9. A method of constructing an Object Linking and Embedding (OLE) for Process Control (OPC) compliant data server from a device-specific noncompliant user application, comprising:
    providing a generic OPC compliant interface object;
    modifying and combining a template with a device-specific interface portion to yield said device-specific noncompliant user application; and
    dynamically linking said device-specific noncompliant user application with said generic OPC compliant interface object to yield said OPC compliant data server, said device-specific noncompliant user application aggregating to said generic OPC compliant interface object.

10. The method as recited in claim 9 further comprising providing a class factory that creates and manages multiple related instances of a device specific server within said OPC compliant data server said device specific server including said device-specific noncompliant user application and said generic OPC compliant interface.

11. The method as recited in claim 9 further comprising providing a class factory that creates instances of a device specific server within said OPC compliant data server and manages global resources with respect to said device specific server, said device specific server including said device-specific noncompliant user application and said generic OPC compliant interface.

12. The method as recited in claim 9 further comprising associating a cache memory with said generic OPC compliant interface object, said generic OPC compliant interface object retrieving items from said cache memory in response to requests from multiple OPC clients.

13. The method as recited in claim 9 further comprising associating a cache memory with said generic OPC compliant interface object, said generic OPC compliant interface object retrieving items from a device through said device-specific noncompliant user application and storing said items in said cache memory.

14. The method as recited in claim 10 further comprising self-registration of said device specific server with said class factory.

15. The method as recited in claim 9 wherein said generic OPC compliant interface object is Component Object Module (COM) compliant.

16. The method as recited in claim 9 further comprising implementing a COM interface by an aggregating COM object and calling said COM interface by an aggregated COM object.

17. A real-time process control system, comprising:
- at least one device capable of generating data;
- a system for constructing an Object Linking and Embedding (OLE) for Process Control (OPC) compliant data server for said data from a device-specific noncompliant user application, including:
  - a generic OPC compliant interface object, and
  - a template associated with said generic OPC compliant interface object, said template being modifiable and combinable with a device-specific interface portion to yield said device-specific noncompliant user application, said device-specific noncompliant user application dynamically linkable with and aggregating to said generic OPC compliant interface object to yield said OPC compliant data server; and
- a client, couplable to said OPC compliant data server, that makes a request of said OPC compliant data server for said data.

18. The system as recited in claim 17 wherein said system further includes a class factory that creates and manages multiple related instances of a device specific server within said OPC compliant data server, said device specific server including said device-specific noncompliant user application and said generic OPC compliant interface.

19. The system as recited in claim 17 wherein said system further includes a class factory that creates instances of a device specific server within said OPC compliant data server and manages global resources with respect to said device specific server, said device specific server including said device-specific noncompliant user application and said generic OPC compliant interface.

20. The system as recited in claim 17 wherein said system further includes a cache memory associated with said generic OPC compliant interface object, said generic OPC compliant interface object retrieving items from said cache memory in response to requests from multiple OPC clients.

21. The system as recited in claim 17 wherein said system further includes a cache memory associated with said generic OPC compliant interface object, said generic OPC compliant interface object retrieving items from a device through said device-specific noncompliant user application and storing said items in said-cache memory.

22. The system as recited in claim 18 wherein said class factory is capable of self-registration.

23. The system as recited in claim 17 wherein said generic OPC compliant interface object is Component Object Module (COM) compliant.

24. The system as recited in claim 17 further comprising a COM interface implemented by an aggregating COM object and called by an aggregated COM object.

* * * * *